(12) United States Patent
Milham et al.

(10) Patent No.: US 10,548,069 B2
(45) Date of Patent: Jan. 28, 2020

(54) WIRELESS AUDIO DEVICE PROVISIONING

(71) Applicant: Harman International Industries, Incorporated, Stamford, CT (US)

(72) Inventors: Don Milham, Watervliet, MI (US); Darrell Brent Erickson, West Jordan, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/677,374

(22) Filed: Aug. 15, 2017

(65) Prior Publication Data

US 2018/0054776 A1 Feb. 22, 2018

Related U.S. Application Data

(60) Provisional application No. 62/377,486, filed on Aug. 19, 2016.

(51) Int. Cl.

| | | |
|---|---|---|
| *H04B 7/00* | (2006.01) | |
| *H04W 48/16* | (2009.01) | |
| *H04W 76/11* | (2018.01) | |
| *G06F 3/16* | (2006.01) | |
| *H04W 4/80* | (2018.01) | |
| *H04W 48/10* | (2009.01) | |

(52) U.S. Cl.
CPC .............. *H04W 48/16* (2013.01); *G06F 3/16* (2013.01); *H04W 76/11* (2018.02); *H04W 4/80* (2018.02); *H04W 48/10* (2013.01)

(58) Field of Classification Search
CPC ..... H04W 48/16; H04W 76/11; H04W 8/005; H04W 40/246; G06F 3/16
See application file for complete search history.

(56) References Cited

U.S. PATENT DOCUMENTS

| | | | | |
|---|---|---|---|---|
| 2007/0160225 A1* | 7/2007 | Seydoux | ............... | H04W 8/005 381/79 |
| 2013/0201887 A1* | 8/2013 | Goto | ................. | H04W 52/0261 370/311 |
| 2013/0290497 A1* | 10/2013 | Millington | .......... | H04L 41/0809 709/221 |

(Continued)

FOREIGN PATENT DOCUMENTS

| | | |
|---|---|---|
| EP | 2219322 A1 | 8/2010 |
| WO | 2015092484 A1 | 6/2015 |

OTHER PUBLICATIONS

European Patent Office, Extended European Search Report Issued in Application No. 17186816.9, dated Oct. 19, 2017, Germany, 8 pages.

*Primary Examiner* — Md K Talukder
(74) *Attorney, Agent, or Firm* — McCoy Russell LLP

(57) ABSTRACT

Embodiments are disclosed for an example computing device for connecting audio devices to a network. In some embodiments, a computing device may store instructions executable to connect to one or more audio devices, and send the one or more audio devices provisioning information that causes the one or more audio devices to scan for additional audio devices and propagate the provisioning information to the additional audio devices. The provisioning information may also cause the one or more audio devices to connect to a central access point by sending a connection request based on the provisioning information to the central access point.

11 Claims, 10 Drawing Sheets

(56) References Cited

U.S. PATENT DOCUMENTS

| | | | | |
|---|---|---|---|---|
| 2014/0003286 A1* | 1/2014 | Estevez | ............... | H04W 48/02 |
| | | | | 370/254 |
| 2014/0073321 A1* | 3/2014 | Kuusilinna | ............ | H04L 67/16 |
| | | | | 455/434 |
| 2014/0194062 A1* | 7/2014 | Palin | ................... | H04W 24/00 |
| | | | | 455/41.2 |
| 2014/0321446 A1* | 10/2014 | Son | ..................... | H04W 48/08 |
| | | | | 370/338 |
| 2015/0172846 A1* | 6/2015 | Ge | ...................... | H04W 8/005 |
| | | | | 370/254 |
| 2015/0230280 A1 | 8/2015 | Dees et al. | | |
| 2015/0326444 A1* | 11/2015 | Smith | ................... | H04L 41/12 |
| | | | | 370/254 |
| 2016/0302060 A1* | 10/2016 | Agardh | ................. | H04L 67/16 |
| 2016/0337190 A1* | 11/2016 | Wachter | ............... | H04W 76/10 |
| 2017/0150337 A1* | 5/2017 | Bareket | ............... | H04W 76/14 |
| 2018/0054776 A1* | 2/2018 | Milham | ............... | H04W 76/11 |

* cited by examiner

WIRELESS AUDIO DEVICE PROVISIONING

CROSS REFERENCE TO RELATED APPLICATIONS

The present application claims priority to U.S. Provisional Application No. 62/377,486, entitled "WIRELESS AUDIO DEVICE PROVISIONING," filed on Aug. 19, 2016, the entire contents of which are hereby incorporated by reference for all purposes.

FIELD

The disclosure relates to connecting one or more audio devices to a wireless network and/or a wireless network access point.

BACKGROUND AND SUMMARY

Wireless audio devices may be connected to a network in order to receive audio data, commands, and/or other communication data from the network (e.g., from other audio devices or computing devices). For example, wireless audio devices may be controlled from a centralized mixing device to adjust volume, equalization, and/or other settings of the audio devices to provide desired audio playback. Wireless connectivity of the audio devices may increase flexibility of positioning of the audio devices relative to audio devices having wired connectivity. However, while an audio device may be connected to a wired network via a physical connection of a communication line, an audio device may be requested to provide identity, security, and other information when attempting to connect to a wireless network. Furthermore, the audio device may be within range of multiple wireless networks, so information regarding a wireless network that is connected to other audio devices (e.g., other speakers, mixers, audio receivers/processors, etc.) may be useful to distinguish a desired wireless network from other wireless networks.

Some attempts to provide information for connecting an audio device to a network (e.g., provisioning information) may include time-consuming, laborious, and error-prone processes of manually sending the information to each audio device that requests a connection to a central access point. The disclosed methods and systems address these issues by providing a process for daisy-chaining audio device discovery and provisioning information transfer. For example, each audio device that is discovered and sent provisioning information for use in connecting to a central access point may discover and send provisioning information to other audio devices until all discoverable audio devices are provided with provisioning information. Once all discoverable audio devices have received the provisioning information, the audio devices may connect to the central access point and begin communicating with other audio devices on the network serviced by the central access point.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
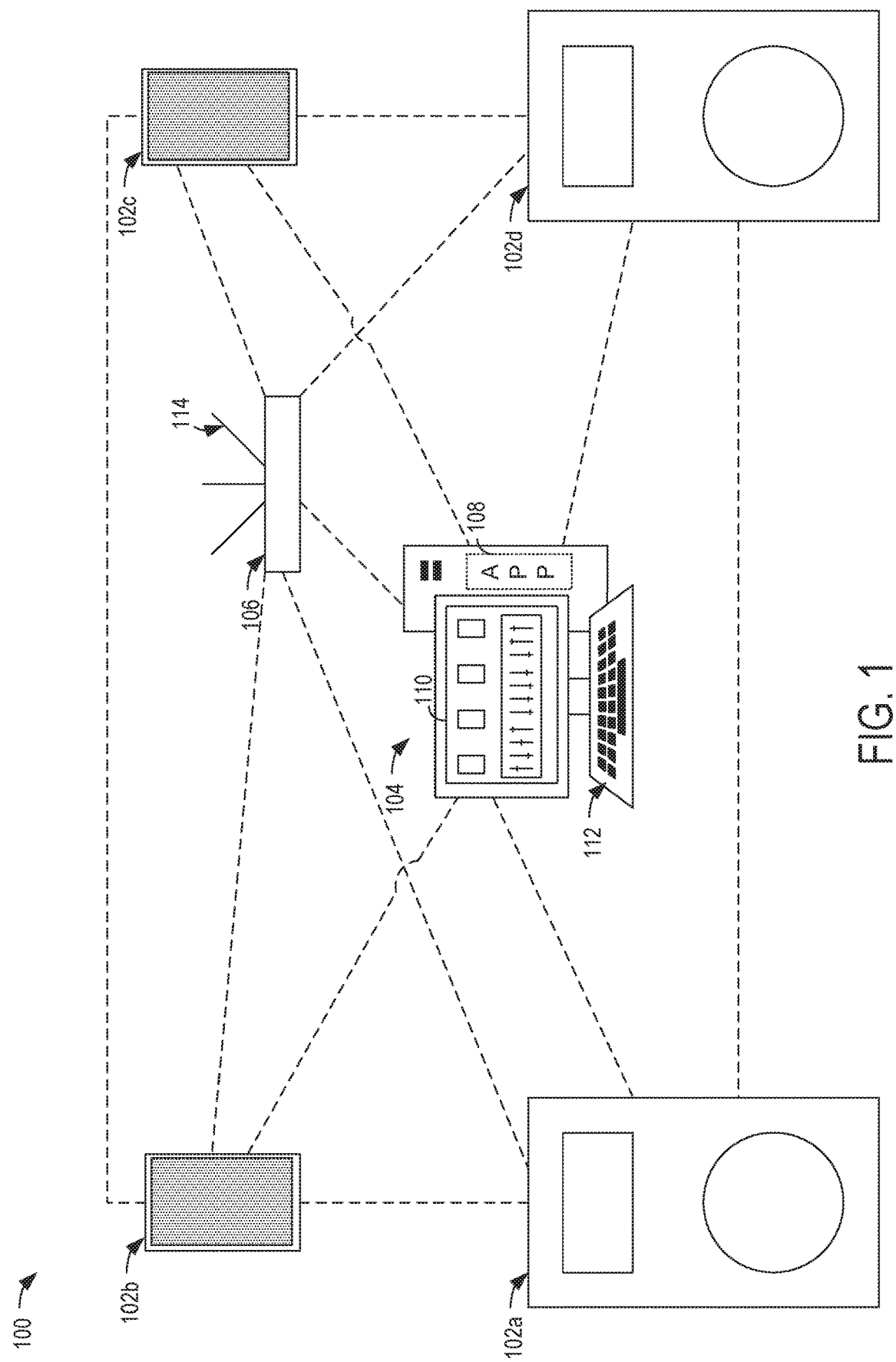
FIG. 1 shows an example audio system in accordance with one or more embodiments of the present disclosure.

Audio output environments may vary widely—from in-home entertainment systems to large-scale arena sound systems. In each case, the audio output environment may include multiple audio output devices (such as speakers or headphones), control audio devices (such as mixers), and/or other audio equipment. In order to provide distributed control over audio equipment in an efficient manner, the audio devices may be connected to the same network as one another (e.g., a wireless network). In this way, instructions may be sent from control audio devices to audio output devices and/or otherwise sent between audio devices in a given audio output environment. While such communication may enable instructions to be efficiently sent between devices, an initialization routine for connecting the audio devices to the network may be time-consuming and may rely on a large amount of user input and effort.

For example, in some systems, an initialization routine may include connecting each audio device to a network individually and manually. A control audio device may be communicatively connected to each audio device, one at a time, to transmit information to the audio devices that allow the audio devices to then attempt to connect to a network. For example, an audio device may be connected to via an application or possibly accessed via an LCD or display on the audio device itself. The network information for the central access point of the network may be entered into the audio device. Such entry is typically performed through typing information via a keyboard, touch surface, or combination of buttons and encoder wheels, which can be a tedious process depending on the audio device. The audio device may then be allowed to connect to the central access point. The steps above are then repeated for every audio device the user desires to be connected to the network. Such a process is both time-consuming and prone to error, due at least in part to the continuing reliance upon user input to make each connection and initiate the transmission of information between devices.

In order to address the above-described issues for connecting multiple audio devices to a network, the disclosure provides methods and systems for automatically connecting a group or set of audio devices to a central access point so that the devices may communicate with one another over a network serviced by the central access point. For example, the disclosure provides for sending provisioning information (e.g., information for enabling an audio device to identify and connect to a central access point, such as a service set identifier (SSID), security type, and/or security information) from a control device to an audio device. The audio device may then scan for other audio devices and propagate the provisioning information to the found audio devices. In this way, the audio devices of a given audio system may communicate provisioning information to one another in a daisy-chain arrangement, which simplifies and automate the process for the user and provides a much better user experience. The disclosed process thus provides a mechanism for individual devices to discover and provision devices in the group automatically. This frees the user from the burden of configuring each audio device individually and ensures that the provisioning information is accurate. Details regarding these and other methods and systems for automating audio device connectivity will be described below.

FIG. 1 shows an example audio system 100 including a plurality of audio output devices (e.g., speakers 102a, 102b, 102c, and 102d), a control audio device (e.g., computing device 104) and a network device (e.g., central access point 106). In the illustrated example, four audio output devices are shown, however any number of audio output devices may be included in a given audio system in any suitable arrangement. For example, audio output devices may be positioned in different locations for providing surround sound for a home entertainment system. In other examples, audio output devices may be arranged in arrays for providing directed sound into an arena, concert hall, and/or other venue. Audio output devices may be configured to output different types or ranges of sounds (e.g., different ranges of frequencies are output by tweeters, subwoofers, woofers, mid-range loudspeakers, full-range loudspeakers, etc.). Accordingly, individual and/or groups of audio output devices may be controlled based on position, type of device, type of output, etc. The audio output devices may include a communication or networking interface for wired and/or wireless communication (e.g., via WiFi, Bluetooth, near-field communication (NFC), ZigBee, cellular, and/or other wireless networking protocols). The audio output devices may further include a processor (e.g., a hardware logic device) and memory (e.g., a hardware storage device) storing instructions executable by the processor to perform actions such as controlling data transfer between the audio output device and other connected devices. For example, the audio output devices may include a host firmware that is able to understand and respond to communicated packets received at the audio output devices.

Instructions for controlling the audio output devices may be provided by one or more control audio devices, such as computing device 104 executing an application 108. For example, the computing device 104 may include a network interface (e.g., similar to the network interface described above for the audio devices, and adapted to connect the computing device to the audio devices and/or to the central access point), a processor, and memory storing instructions executable by the processor to configure and control other audio devices according to the application 108. Information for configuring the audio devices may include provisioning information to enable the audio devices to connect to a network. The provisioning information may be sent via packages and/or packets, which are able to be read (e.g., after decryption, in examples where the packets are encrypted for security purposes), parsed, processed, and forwarded by the audio devices (e.g., by the audio output devices). The application 108 may include a software application written to run on a variety of operating systems and platforms including desktop Windows, Macintosh, and Linux systems as well as mobile platforms including iOS, Android, and Windows. Accordingly, although computing device 104 is illustrated as a desktop computer, it is to be understood that computing device 104 may include any suitable computing device, including mobile devices (e.g., smartphones, laptops, tablets, infotainment systems/head units in a vehicle, etc.), audio mixers, and/or other computing systems. Computing device 104 may include a display 110 for presenting visual information to a user of the computing device. User input to the computing device may be received via any suitable input mechanism, including peripheral user input devices (e.g., keyboard 112, mouse, touch pad, etc.) and/or integrated user input devices (e.g., actuators integrated in the computing system, touch and/or hover sensors integrated in the display 110, etc.).

A network device, such as central access point 106, may include a piece of network equipment (e.g., a networking interface) that allows multiple devices to connect to it and can pass network packets around to the connected devices. The central access point 106 may operate wirelessly (e.g., receiving communication via antennae 114) and/or be hard-wired into the audio system and/or network. For example, the central access point 106 may provide centralized access control for a closed network (e.g., only including the audio devices within range of and able to directly connect to the central access point with no intervening devices) and/or may provide centralized access control for a larger or open network (e.g., including audio devices that are not in range of or able to directly connect to the central access point). In the latter example, the central access point may connect to another central access point or other networked device (e.g., via a wireless and/or wired connection), which is connected to further audio devices. In such an example, communication packets may be transmitted from the further audio devices to the other central access point, and then from the other central access point to central access point 108 for distribution to audio devices connected to the central access point 108. Once all audio devices (e.g., any device that receives audio as input, sends audio as output, and/or generates control information for devices that receive audio as input or send audio as output) are connected to the central access point, communication may be provided between audio devices (e.g., audio output devices and control audio devices).

Figure 2A:
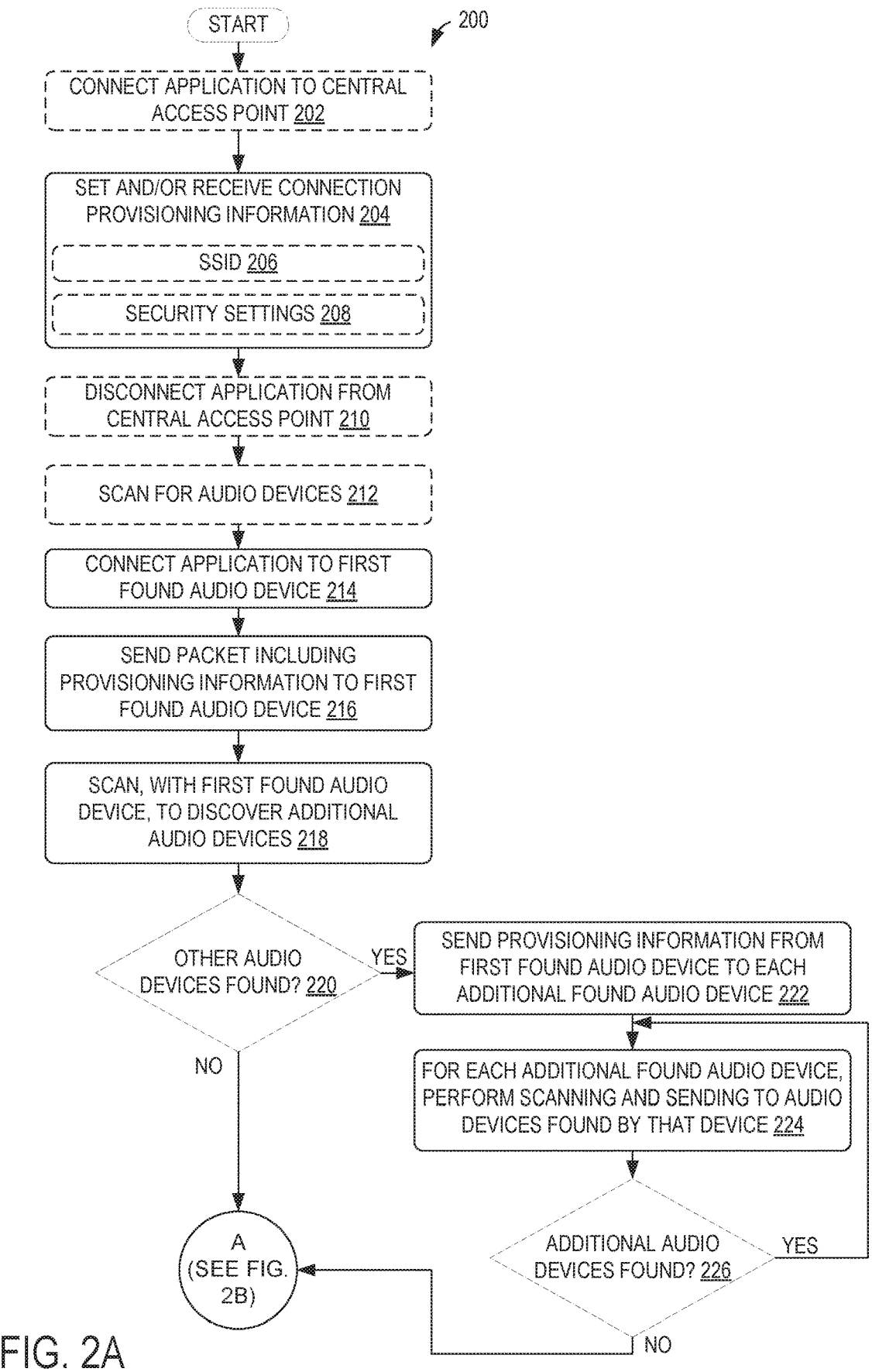
FIGS. 2A and 2B show a flow chart of an example method for connecting audio devices to a network in accordance with one or more embodiments of the present disclosure.
Figure 2B:
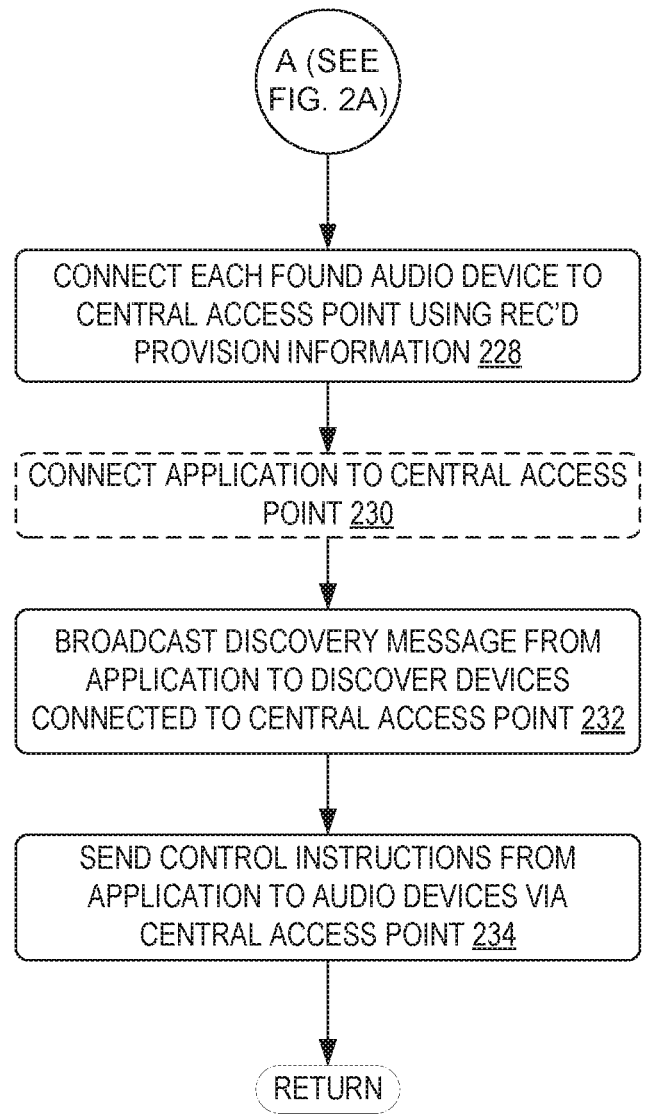
Figure 3:
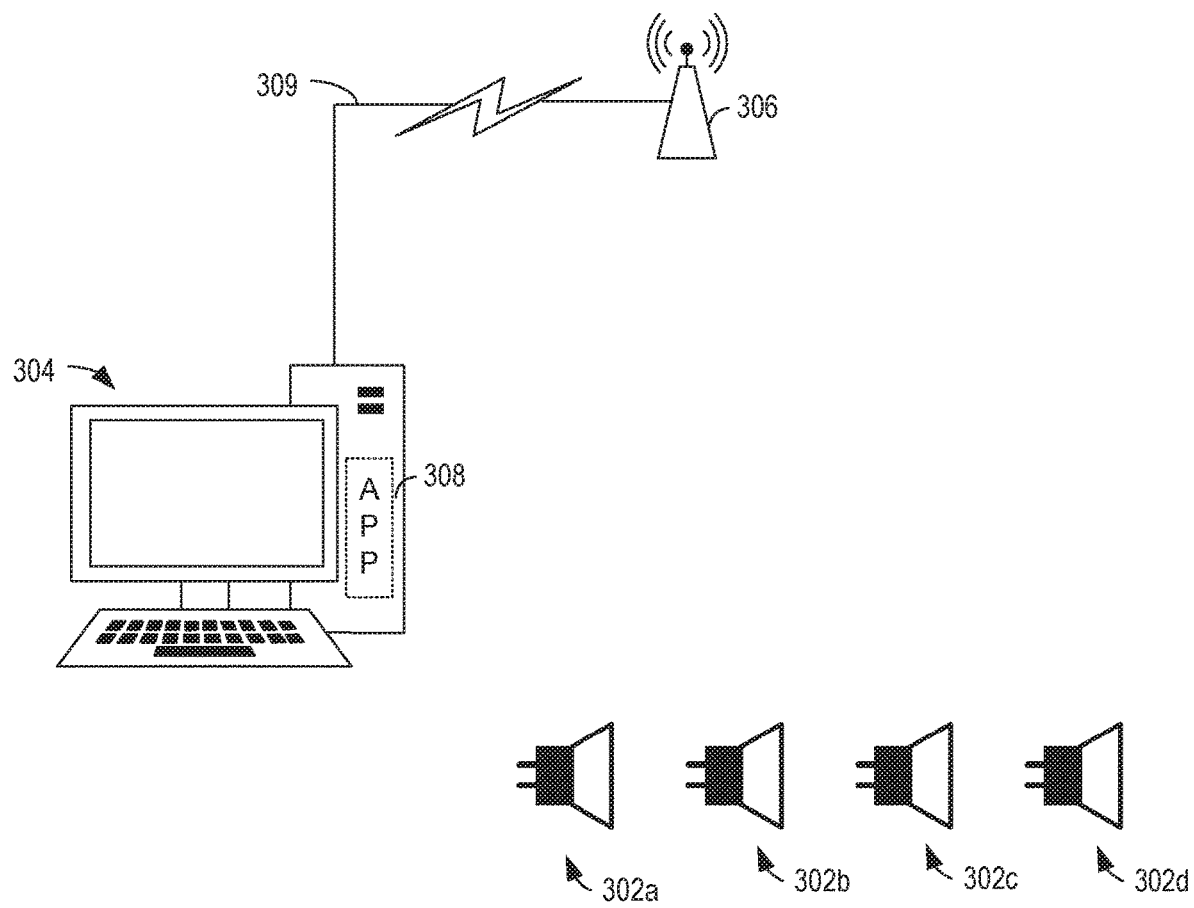
FIGS. 3-9 show different connections between devices of example audio systems during network connectivity processes in accordance with one or more embodiments of the present disclosure.

FIGS. 2A and 2B show a flow chart of a method 200 for automatically connecting audio devices to a network. The method optionally includes, at 202, connecting an application (e.g., an application for configuring and controlling audio devices, such as application 108 of FIG. 1) to a central access point for a network. For example, turning to FIG. 3 briefly, an example audio system is shown including a plurality of speakers 302a-302d, a computing device 304, and a central access point 306. The elements of FIG. 3 may include and/or be included in the similarly-named elements of FIG. 1. Accordingly, the description of the speakers, computing device, and central access point of FIG. 1 may apply to the likewise-named elements of FIG. 3. In the example of FIG. 3, an application 308 (e.g., which may be an example of application 108 of FIG. 1) is stored in and executed by computing device 304. Accordingly, a user may launch and then connect the application 308 to the central access point 306, as indicated by the communication line 309. Communication line 309 may include a wireless and/or a wired connection between the computing device 304 and the central access point 306. In other examples, as will be discussed below with respect to FIG. 4B, the application 108 may be included in a central access point, so the application may not need to be connected to the central access point (since the application is already able to access information stored in the central access point).

Returning to FIG. 2A, the method 200 includes, at 204, setting and/or receiving connection provisioning information. The connection provisioning information may include an SSID, as indicated at 206, security information (e.g., security type, passwords, and/or other security information for WiFi Protected Access (WPA or WPA2), Wired Equivalent Privacy (WEP), and/or other security protocols), as indicated at 208, and/or other information for allowing an audio device to connect to the central access point. The user may set and save connection provisioning information including the SSID and/or any security settings. For example, the user may enter some or all of the connection provisioning information into the application, and instruct the central access point to save the entered connection provisioning information. In examples where the application is executed by a computing device remote from the central access point, the provisioning information may be received via an external communication link (e.g., communication line 309 of FIG. 3). In examples where the application is executed by the central access point, the provisioning information may be received and/or retrieved from a storage device local to the central access point and/or accessible by the application (e.g., via an internal bus rather than an external communication link).

At 210, the method optionally includes disconnecting the application from the central access point. As discussed above, in some examples the application may be executed by the central access point. In such examples, the application may not be disconnected from the central access point since the application is integrated therein. In other examples, where the application is executed by a computing device remote from the central access point (e.g., computing device 304 of FIG. 3), the application may be disconnected from the central access point in order to allow the computing device to connect to other audio devices.

At 212, the method optionally includes scanning for audio devices. For example, the application may send out a broadcast and/or targeted message (e.g., if the application has access to a list of audio devices expected to be located nearby) to discover audio devices within a communication range of the application. At 214, the method includes connecting the application to a first found audio device. For example, if the application scanned for audio devices, the first found audio device may include an audio device that transmitted a first response message received by the application.

In examples where the application did not scan for audio devices, the first found audio device may include an audio device that is physically and/or manually connected to the computing device (e.g., via user input, such as an actuation of a button on the first found audio device). The connection at 214 may be wired or wireless in such examples. A wired connection may enable the user to ensure that a particular audio device is the first found device and/or provide a faster communication link, whereas a wireless connection may further automate the connection process such that further user input is not used (e.g., the scanning and connection of 212 and 214, respectively, may be initiated responsive to the receipt of the provisioning information at 204 and without further user input requesting the scanning and connection).

In any of the above examples for connecting audio devices to the computing device 304/application 308, the communication between the network devices (e.g., the audio device and the computing device, the audio device and one or more other audio devices, the audio device and the central access point 306, the computing device 304 and the central access point 306, and/or any other network devices in communication) may be secured using built-in wireless security protocols for the communication link (e.g., Wired Equivalent Privacy [WEP], Wi-Fi Protected Access [WPA]/WPA2, network authentication routines, etc.) and authentication routines provided by the application 308 (e.g., where the user logs into the application and is only allowed to commence a scanning process after being authenticated thereby). In one example, audio devices may be discovered through a BLUETOOTH discovery process, whereby the provisioning information is included in the BLUETOOTH discovery message(s). The temporal qualities of the audio device connectivity may also provide some security for the communications. For example, a temporal window may start with a button press or other manual user activation (or with the start of an automatic scanning routine), and communication between the first found audio device and the computing device 304 and/or between each audio device in the network may only be enabled to occur for the duration of the temporal window (e.g., until the window expires or closes). The temporal window may have a predetermined size and/or may be sized according to one or more parameters of the network (e.g., a number of audio devices in the network, a latency of the network, a bandwidth of the network, etc.) to accommodate communications between the devices. As a non-limiting example, the temporal window may have a size of fifteen seconds to five minutes, depending on the parameters of the network.

Another example of securing communications between network devices includes comparing an SSID (or a portion of an SSID) for an audio device requesting provisioning information to a list of expected SSIDs and/or an expected SSID parameter (e.g., an expected pattern of alphanumeric characters within the SSID). Yet another example of securing communications between network devices includes using encrypted packets to send provisioning information and/or other communicated information. For example, the audio devices of the network may have encryption/decryption information stored thereon (e.g., encryption key/protocol information), which is compatible with an encryption mechanism employed by the computing device 304 and/or application 308 and/or otherwise is known by the computing device 304 and/or application 308. In some examples, the encryption used to encrypt the provisioning information may be based on or may use the SSID (or a portion of the SSID) of the audio device receiving the communication. One or both of the initial discovery information (e.g., acquired during scanning) and the provisioning information communicated between devices of the network may be communicated in an encrypted format. For example, communication during discovery of the audio device(s) may be communicated as encrypted data, whereas communication of the provisioning information may be unencrypted and targeted only at the audio devices discovered using the encrypted discovery information. It is to be understood that any number and combination of the above-described security mechanisms may be used to secure communication between the first found audio device and the computing device 304/application 308 and/or between each of the audio devices to provide multiple layers of security for the communications.

Figure 4A:
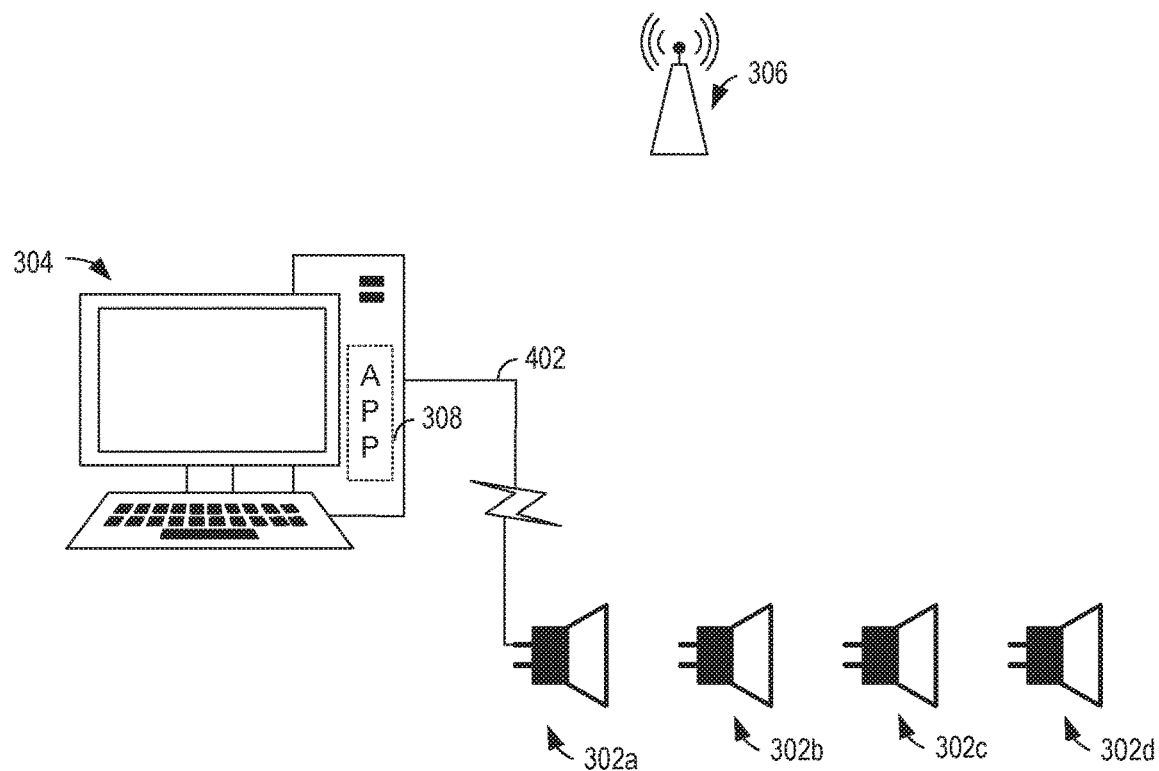
Figure 4B:
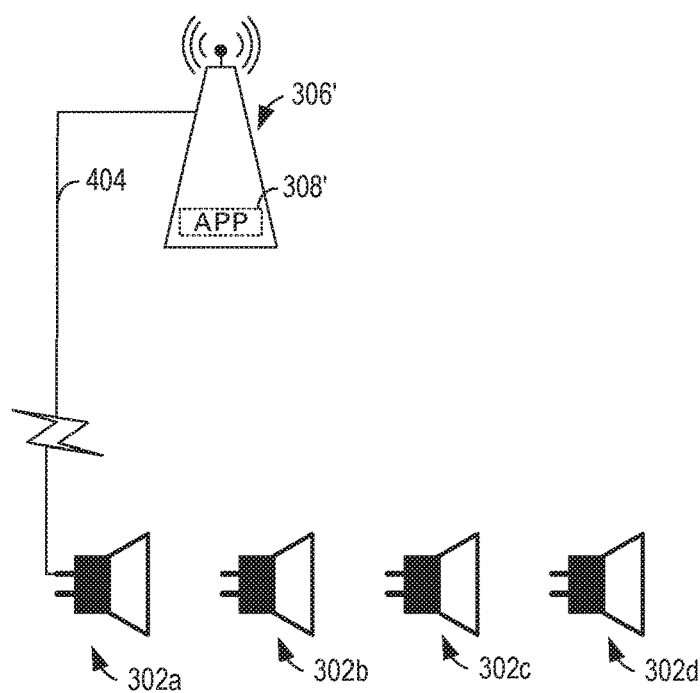

Turning briefly to FIGS. 4A and 4B, examples are shown for connecting an application to a first found audio device. In the example of FIG. 4A, the application 308 is hosted by the computing device 304. Accordingly, a connection is made between the computing device 304 and a first found audio device, speaker 302a, via a communication link 402 (e.g., which may be wired or wireless). In the example of FIG. 4B, an application 308' is located in a central access point 306', and a connection is made between the central access point 306' and a first found audio device, speaker 302a, via communication link 404 (e.g., which may be wired or wireless). The application 308' may be the same or similar to application 308 of FIGS. 3 and 4A. For example, the application 308' may be modified relative to the application 308 of FIGS. 3 and 4A in order to operate within and/or be executed by central access point 306', but may otherwise perform at least some of the same operations as the application 308 (e.g., configuring and controlling other audio devices). Likewise, the central access point 306' may be the same or similar to central access point 306 of FIGS. 3 and 4A. For example, the central access point 306' may be modified relative to the central access point 306 in FIGS. 3 and 4A in order to accommodate the storage and execution of application 308'. It is to be understood that references to the application in the method 200 of FIGS. 2A and 2B may refer to either application 308 as executed by a computing device (e.g., computing device 304) remote from a central access point (e.g., central access point 306) or application 308' as executed by a central access point (e.g., central access point 306').

Returning to FIG. 2A, the method includes sending a network packet to the first found audio device, as indicated at 216. The network packet includes the above-described provisioning information (e.g., the provisioning information described above at 204, 206, and 208), useable to connect the audio device to the central access point. The packet may include a block of standard data (called a header) followed by custom payload data or protocol data (e.g., including the provisioning information). As discussed above, the packet (e.g., at least a portion of the data included in the packet) may be encrypted and/or otherwise secured to provide packet-level security to the communication between audio devices, the central access point, and/or other computing devices. The network packet may be sent along link 402 and/or link 404 of FIGS. 4A and 4B, respectively. Although referred to as a network packet, it is to be understood that the provisioning information may be transmitted to the audio device in any suitable manner, including via multiple packets, in different packet formats, etc. In some examples, the information may be transmitted as a stream, with repeating information (e.g., for communication links that are weak or otherwise have a data drop rate that is higher than a threshold). In some examples, the application may select a method for transmitting the provisioning information based on the type of link, real time traffic information on the link, a size of the provisioning information, and/or other suitable factors.

The provisioning information sent to the first found audio device may be configured for that audio device. For example, the provisioning information may include security information configured for that audio device based on identity information for the first found audio device. In additional or alternative examples, the provisioning information may include an amount, format, or type of information based on capabilities of the audio device. For example, if the central access point is configured to allow connection via multiple networking protocols, the application may receive, retrieve, and/or set provisioning information according to each protocol and transmit provisioning information for a given protocol to the first found audio device based on the communication protocol(s) supported by that audio device. In still other examples, the provisioning information may be the same for all audio devices.

Figure 5:
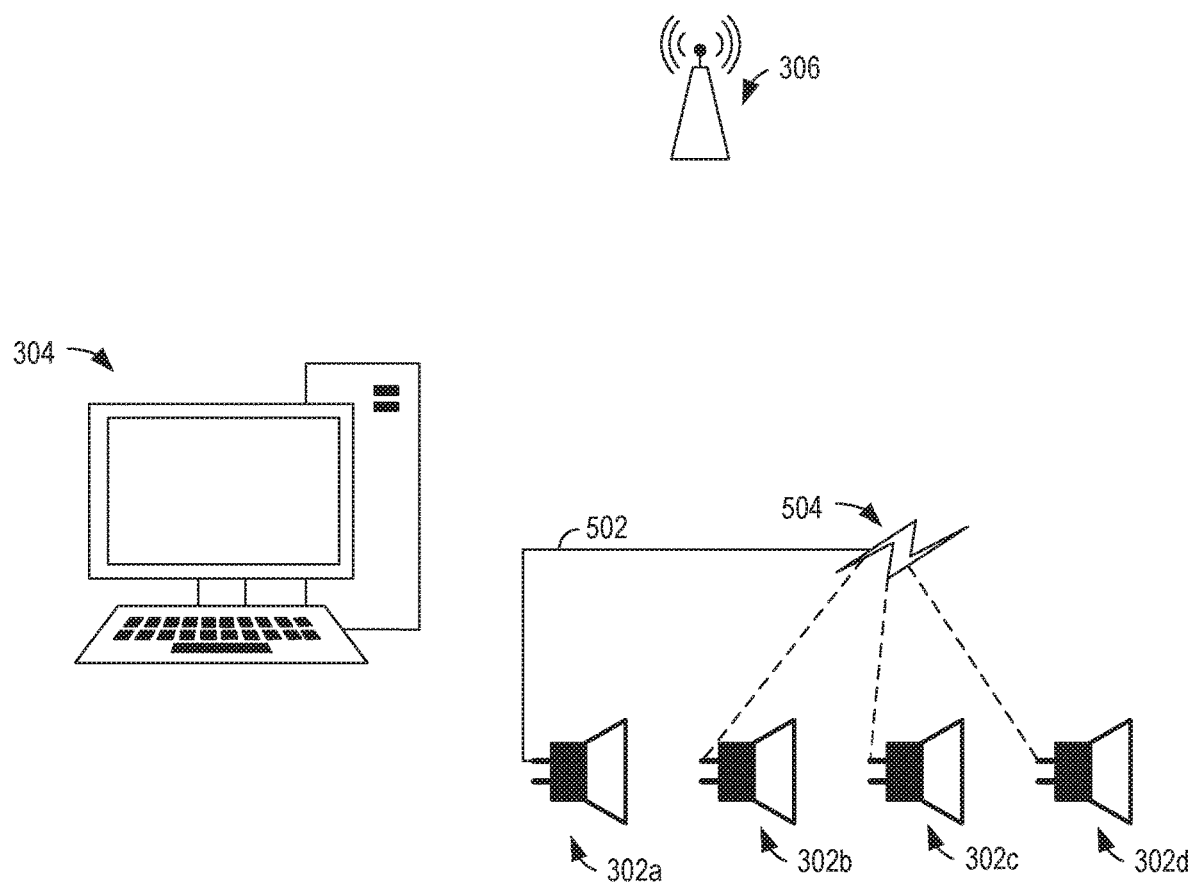

At 218, the method includes scanning, with the first found audio device, to discover additional audio devices. For example, the audio device that receives the provisioning information from the application may disconnect from the application and then scan available wireless networks for other audio devices that comply with a naming or discovery standard. The first found audio device may then wait for a reply (e.g., an expected reply message, according to a predefined format) from other audio devices. Turning briefly to FIG. 5, an example audio device-based scanning operation is illustrated. As shown, speaker 302a, which was the first found speaker by the application 308 of FIG. 4A (or application 308' of FIG. 4B), broadcasts or otherwise sends a discovery message over a communication link 502 (e.g., which may be wired or wireless) to network 504 in order to attempt to locate other audio devices on the network (such as speakers 302b-302d). As described above, any number and combination of security mechanisms disclosed herein may be utilized by the audio devices to secure inter-audio device communication.

Figure 6:
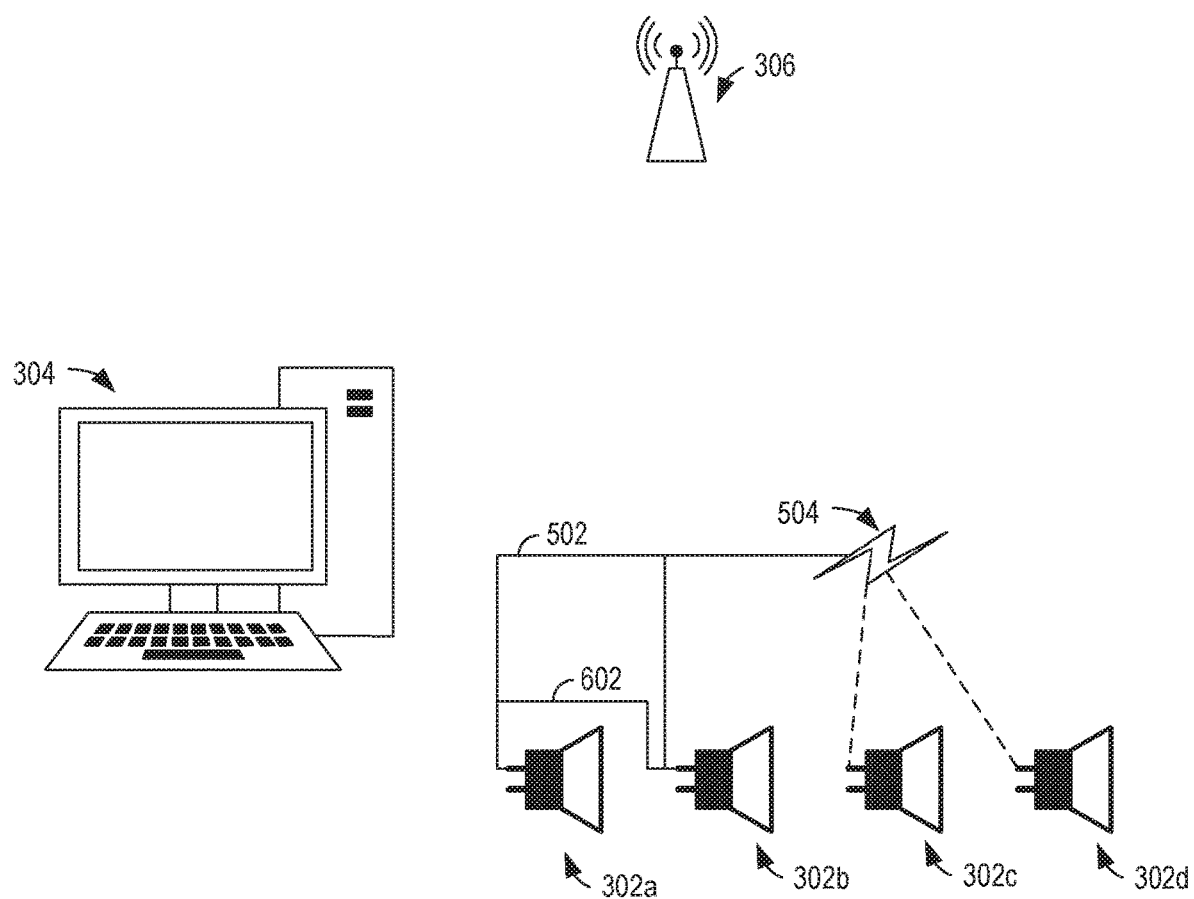

Returning to FIG. 2A, the method includes, at 220, determining if other audio devices are found (e.g., as a result of the scanning of 218). If other audio devices are found, the method proceeds to 222 and includes connecting the first found audio device to the additional found audio devices, and sending provisioning information from the first found audio device to each additional found audio device. Turning briefly to FIG. 6, a connection is shown as being formed between the first found audio device (speaker 302a) and an additional found audio device (speaker 302b) via communication link 602 (e.g., which may be a wired or wireless link). The provisioning information may be sent from speaker 302a to speaker 302b via the communication link 602.

In some examples, the same provisioning information received by the first found audio device from the application is sent, unchanged (e.g., without sending any additional or different information), to each additional found audio device (e.g., discovered by the first found audio device during the scanning of 218 of FIG. 2A). In other examples, the first found audio device may process and/or otherwise modify the provisioning information received from the application to generate updated provisioning information to be sent to the additional found audio devices.

For example, the first found audio device may format the provisioning information based on the capabilities and/or configuration of each additional found audio device. In additional or alternative examples, the first found audio device may append information to the provisioning information received from the application. The appended information may identify the first found audio device, start a counter (e.g., a hop-based counter that is set to increment each time it is received by an audio device), identify the additional found audio device that is receiving the provisioning information from the first found audio device, and/or may include any other suitable information.

The appended information may help to track the flow of the provisioning information through the network, monitor a number of connections made between the first found audio device and other audio devices, and/or identify audio devices that are to be connected to the central access point.

Returning to FIG. 2A, as indicated at 224, the newly discovered audio devices (e.g., discovered via the scanning at 218) may then begin to scan for and discover further additional devices and pass on provisioning information (e.g., performing the same or similar operations to those performed by the first found audio device in 218-222). For example, as shown in FIG. 6, the additional found audio device (speaker 302b) is shown as being connected to network 504, and may thus attempt to discover the other audio devices on the network (e.g., speakers 302c and 302d) simultaneously with the first found audio device (speaker 302a).

Figure 9:
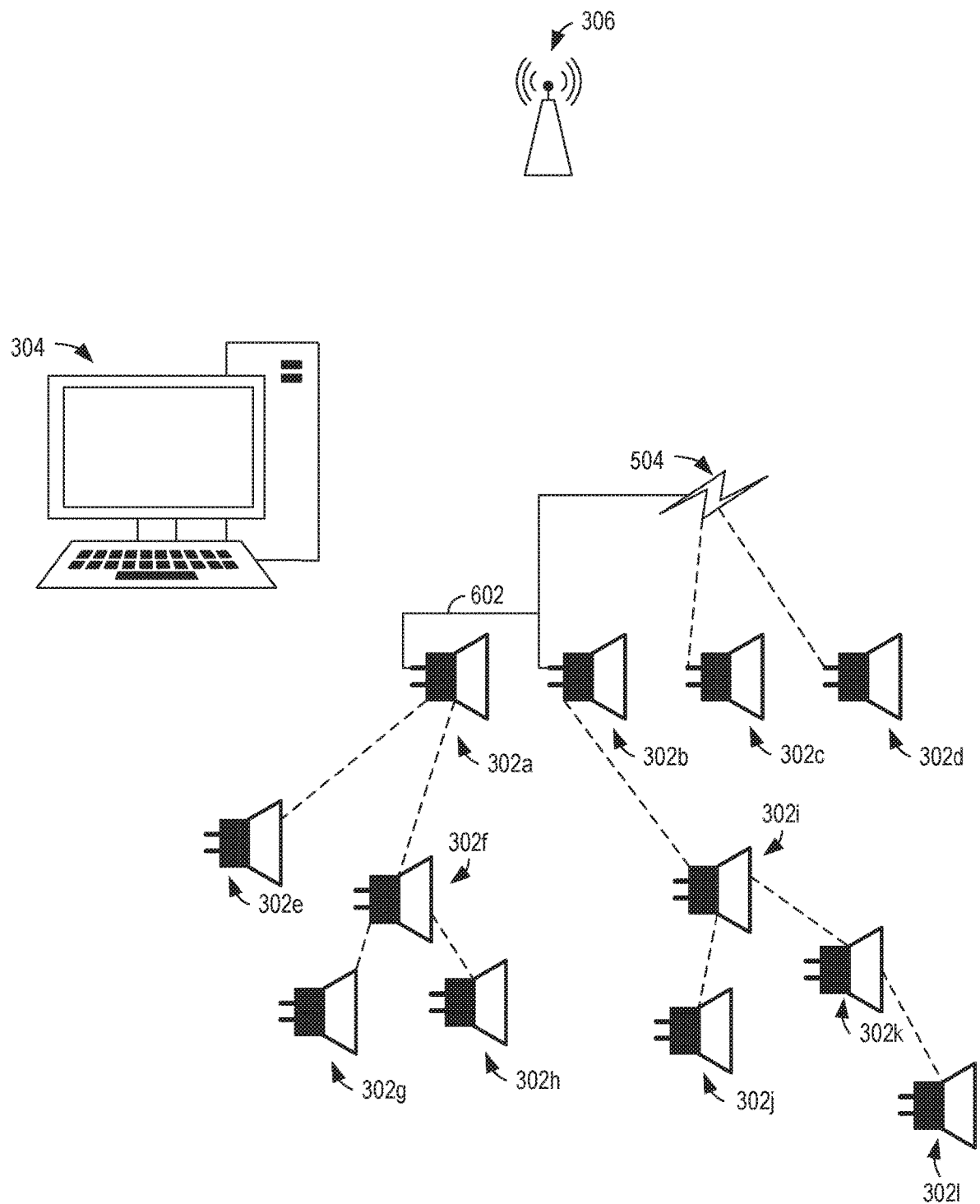

As soon as an audio device receives provisioning information, that audio device may begin scanning for other audio devices and sending provisioning information to discovered audio devices, such that multiple audio devices may be scanning and sending provisioning information on the network at the same time. In this manner, many devices may be discovered quickly and efficiently, without additional user input. An example of "star" discovery is shown in FIG. 9, in which audio devices may discover further audio devices, which may, in turn, discover still further audio devices. For example, audio device 302a may discover audio devices 302e and 302f, and audio device 302f may discover audio devices 302g and 302h. While audio device 302a is discovering audio devices 302e and 302f, audio device 302b may (e.g., simultaneously and/or otherwise independently) discover audio device 302i, which may in turn discover audio devices 302j and 302k. Audio device 302k may further discover audio device 302l. Each connection between devices may be used to transmit provisioning information as discussed above.

In order to reduce redundant transmissions of provisioning information, during the scanning, if a device has already been discovered (e.g., by the same or a different discovering device), the already-discovered device may send a message to the discovering device to pass over the already-discovered device. In cases where an audio device is connected to more than one network, that audio device may perform discovery on either or both networks in order to find and send provisioning information to more discoverable audio devices.

Returning to FIG. 2A, at 226, the method includes determining if further additional audio devices are found. If so, the method returns to 224 to continue scanning and sending provisioning information between audio devices (e.g., in a daisy-chain manner). Accordingly, the scanning and sending of provisioning information may continue until all discoverable devices have received the provisioning information. Discoverable audio devices may include all audio devices that are within range of the first found audio device (e.g., directly or via intermediate devices) that have opted into being discovered (e.g., via actuation of a mechanical button, setting of a software configuration file, inclusion in a "discoverable list," etc.). In additional or alternative examples, discoverable audio devices may include all audio devices that are within range of the first found audio device (e.g., directly or via intermediate devices) that are not opted out of being discovered (e.g., via actuation of a mechanical button, setting of a software configuration file, inclusion in a "blocked list," etc.).

In some examples, each audio device may be limited to discovering and sending provisioning information to a predetermined number of audio devices. In additional or alternative examples, a total number of simultaneously-transmitted discovery messages and/or provisioning information transmissions may be limited to another predetermined number. Such examples may control an amount of traffic on a network joining the audio devices.

Figure 7:
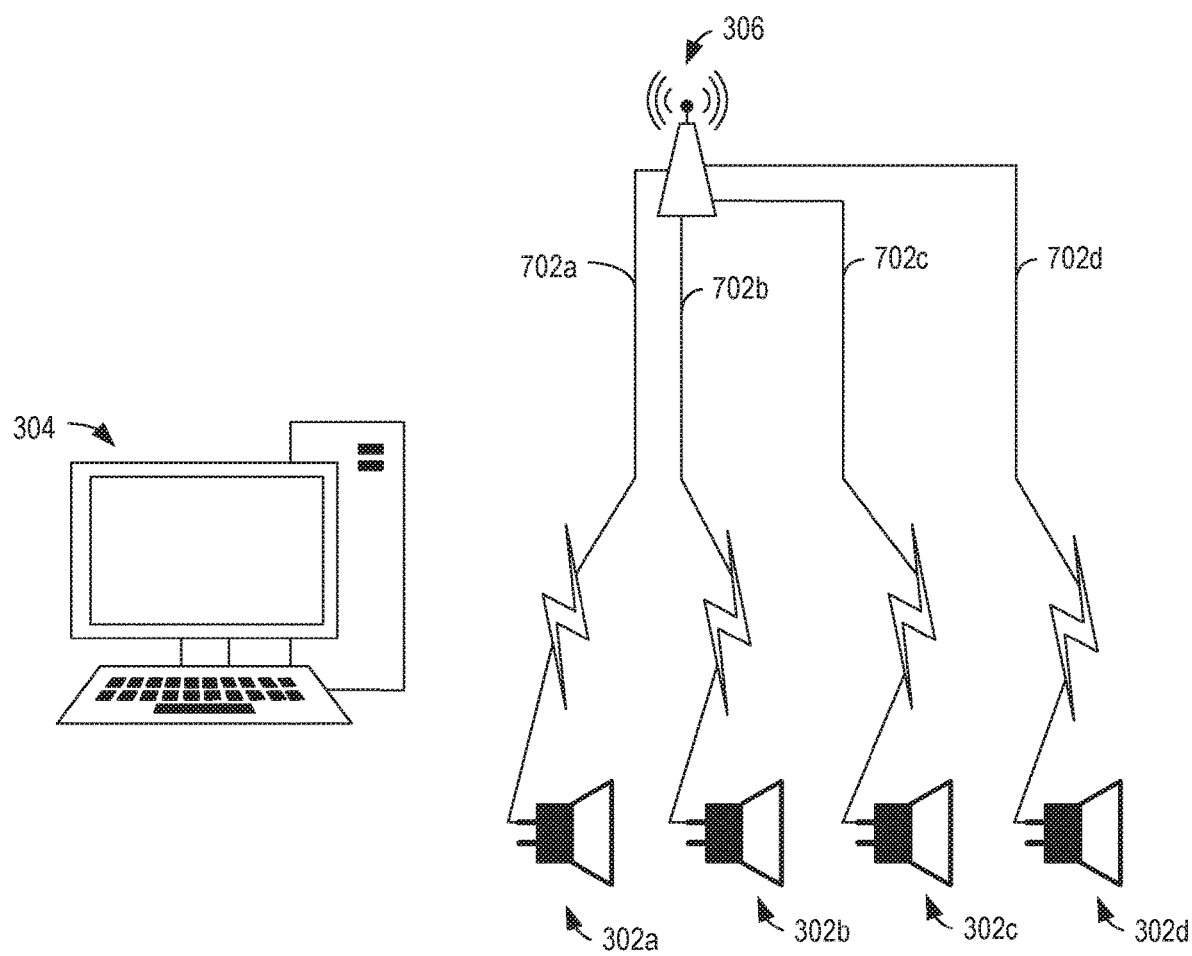

Once all discoverable devices have received the provisioning information (e.g., once no other audio devices are found, "NO," at 220 or 226), the method proceeds to 228 of FIG. 2B and includes connecting each found audio device to the central access point using received provisioning information (e.g., where each found audio devices utilizes the provisioning information that it received to connect to the central access point). For example, the audio devices may generate and send a connection request to the central access point, the connection request including only the provisional information (e.g., as received from the application and/or from another audio device) in some examples. In other examples, the connection request may include some or all of the provisional information and/or may be otherwise based on the provisional information. Turning briefly to FIG. 7, each speaker 302a-302d is shown as being individually connected to central access point 306 (e.g., via separate communication links 702a-702d, which may be wireless links). In this way, each audio device may communicate with the central access point individually. For example, control instructions may be targeted to a particular audio device or subset/group of audio devices via the respective communication links for that device/those devices. Furthermore, the individual communication links enable instructions to be sent simultaneously to each audio device. Although the inter-audio device communication is described as occurring openly above, it is to be understood that in some examples, additional security layers may be established at various points of the network connectivity process. For example, each audio device may send a password, identifier, and/or other security information to each discovered audio device during the discovery/scanning process before being allowed to send the provisioning information. Likewise, additional security information may be exchanged between the application and the first found audio device and between all found audio devices and the central access point before communication commences between the respective devices.

At this point all of the devices are able to communicate with each other over the same network. It is to be understood that in some examples, each device may connect to the central access point (e.g., using the provisioning information) as soon as the provisioning information is received or anytime thereafter (e.g., regardless of whether additional audio devices are waiting to be discovered). In such examples, audio devices that are already connected to the central access point may continue to discover and send provisioning information to additional audio devices as long as a network interface included in the audio device is adapted to accommodate such communication links and transmissions.

Returning to FIG. 2B, the method optionally includes connecting the application to the central access point, as indicated at 230, so that the application is able to communicate with all of the audio devices on the same network at the same time. For example, the connection of 230 may be performed in examples where the application is executed by a computing device remote from the central access point (e.g., as shown in FIG. 4A). In other examples, where the application is executed by the central access point (e.g., as shown in FIG. 4B), the operation at 230 may not be performed, as the connection between the audio devices and the central access point may automatically connect the audio devices to the application, such that the application is able to communicate with all of the audio devices on the same network at the same time.

At 232, the method includes broadcasting a discovery message from the application to discover devices connected to the central access point. For example, the application may periodically broadcast the discovery message of 232 and/or may broadcast the discovery message responsive to receiving an indication (e.g., from the central access point, from an audio device, etc.) that the audio devices have connected to the central access point. As discussed above, in some examples, the audio devices may append information to the provisioning information such that the propagation of provisioning information throughout the audio devices may also allow the audio devices to send discovery messages to the central access point when the audio devices connect to the central access point. In such examples, the application may not broadcast a discovery message, since the audio devices that are connected may already be known. In additional or alternative examples, the application may still broadcast a discovery message, and may use the additional information received from the audio devices when connected to the central access point to verify or diagnose communication issues (e.g., if an expected number of connected audio devices is different from a number of audio devices that responded to the discovery message).

Figure 8:
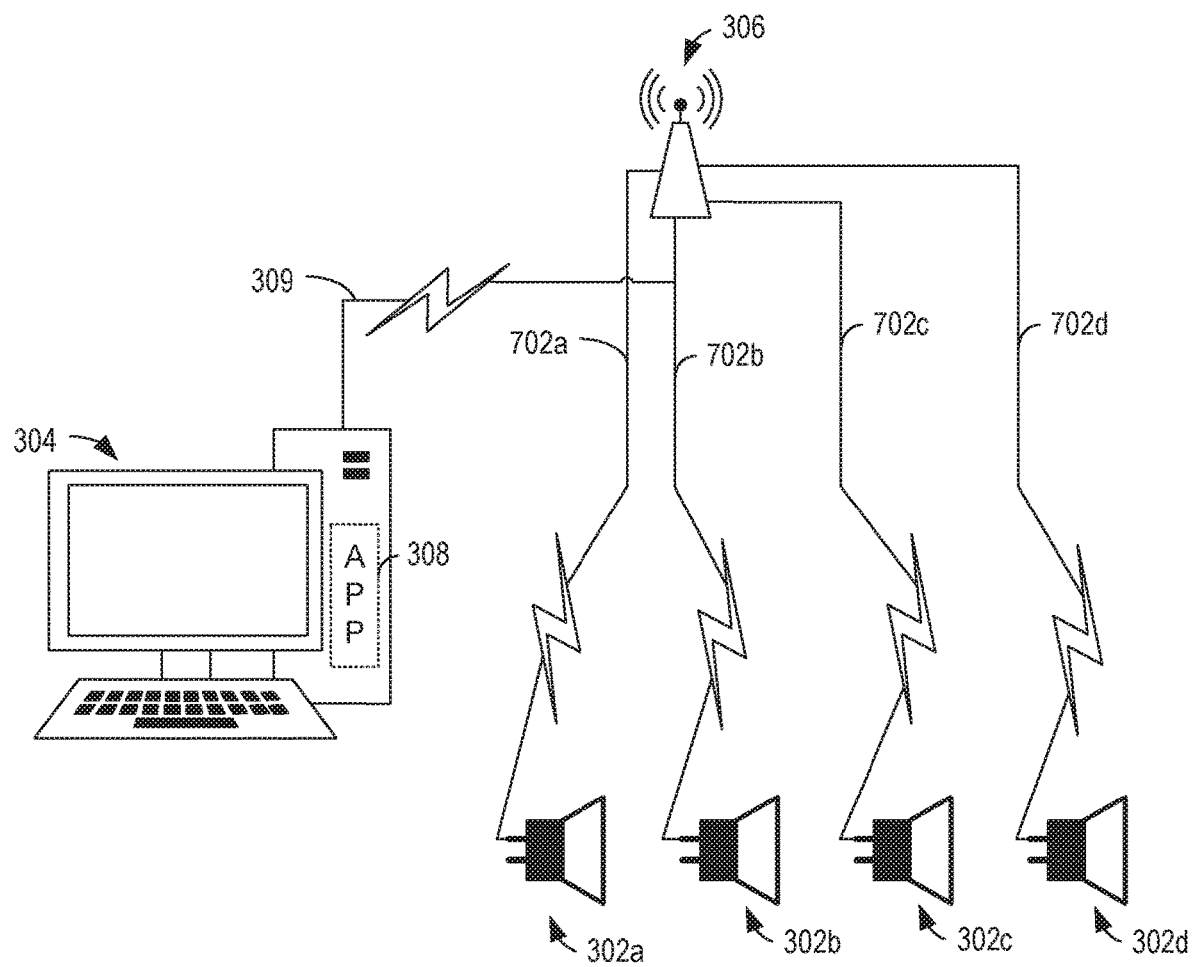

Turning briefly to FIG. 8, the communication link 309 between the application 308 of the computing device 302 is shown as being re-established, thereby allowing the application to send discovery messages and/or control instructions to each of the connected audio devices (e.g., speakers 302a-302d). Accordingly, returning to FIG. 2B, the method may include sending control instructions from the application to one or more of the audio devices via the central access point, as indicated at 234. For example, an instruction to increase or set a volume of each of the speakers to 10 dB may be sent from the application to each of the speakers via the central access point simultaneously (e.g., so that each speaker increases/sets the associated volume at the same time). In other examples, individual instructions may be sent to different speakers simultaneously. For example, all connected mid-range speakers may be instructed to set a respective volume to 10 dB while all connected woofers may be instructed to set a respective volume to 5 dB. The instructions to the mid-range speakers may be sent individually from but simultaneously to the instructions to the woofers.

The disclosure provides for a computing device including a network interface adapted to be communicatively connected to one or more audio devices, a processor, and a storage device storing instructions executable by the processor to transmit a discovery message to a first audio device of the one or more audio devices, and, upon receipt of a response to the discovery message from the first audio device, transmit provisioning information to the first audio device, the provisioning information including data that causes the first audio device to transmit further discovery messages to other audio devices and propagate the provisioning information to a second audio device that responds to the further discovery messages, the data of the provisioning information further causing the first audio device and the second audio device to transmit a connection request based on the provisional information to a central access point. In a first example of the computing device, the computing device may additionally or alternatively be the central access point. A second example optionally includes the first example, and further includes the computing device, wherein the computing device is remote from the central access point. A third example optionally includes one or both of the first example and the second example, and further includes the computing device, wherein the instructions are further executable by the processor to receive the provisioning information from the central access point. A fourth example optionally includes one or more of the first through the third examples, and further includes the computing device, wherein the second audio device is configured to transmit additional further discovery messages to a third audio device and propagate the provisioning information to the third audio device responsive to receiving a response to the additional further discovery messages from the third audio device. A fifth example optionally includes one or more of the first through the fourth examples, and further includes the computing device, wherein the first audio device appends information regarding the first audio device to the provisioning information to generate and send updated provisioning information to the second audio device. A sixth example optionally includes one or more of the first through the fifth examples, and further includes the computing device, wherein the first audio device transmits, to the second audio device, the same, unmodified provisioning information that the first audio device receives from the computing device. A seventh example optionally includes one or more of the first through the sixth examples, and further includes the computing device, wherein the provisioning information includes one or more of an SSID, a security type, and security information for the central access point.

The disclosure also provides for an audio device including a network interface adapted to be communicatively connected to one or more audio devices and a central access point, a processor, and a storage device storing instructions executable by the processor to receive, from a first audio device of the one or more audio devices, a discovery message, transmit, to the first audio device, a response to the discovery message, receive, from the first audio device, provisioning information including one or more of a service set identifier (SSID), a security type, and security information for the central access point, transmit, via the network interface, a discovery message to a second audio device of the one or more audio devices, receive, from the second audio device of the one or more audio devices, a response to the discovery message, transmit the received provisioning information to the second audio device, and transmit a connection request based on the provisional information to a central access point. In a first example of the audio device, the instructions may additionally or alternatively be further executable to receive, from the central access point, control instructions from a control device to adjust operation of the audio device, and to adjust operation according to the received control instructions. A second example of the audio device optionally includes the first example, and further includes the audio device, wherein the control device is the central access point. A third example of the audio device optionally includes one or both of the first example and the second example, and further includes the audio device, wherein the control device is the first audio device. A fourth example of the audio device optionally includes one or more of the first example through the third example, and further includes the audio device, wherein the control device is a third audio device of the one or more audio devices, and wherein the first audio device received the provisioning information from the third audio device.

The disclosure also provides for a method for connecting a plurality of audio devices to a central access point, the method including receiving connection provisioning information from the central access point, connecting to a first audio device of the plurality of audio devices, and transmitting the received provisioning information to the first audio device, the provisioning information adapted to cause the first audio device to discover a second audio device of the plurality of audio devices, transmit the provisioning information to the second audio device, and send a connection request based on the provisioning information to the central access point. In a first example of the method, the method may additionally or alternatively further include broadcasting a discovery message to discover audio devices connected to the central access point. A second example of the method optionally includes the first example, and further includes the method, further including transmitting control instructions to the discovered audio devices via the central access point. A third example of the method optionally includes one or both of the first example and the second example, and further includes the method, wherein the provisioning information is further adapted to cause the first audio device to append information regarding the first audio device to the provisioning information to generate and send updated provisioning information to the second audio device. A fourth example of the method optionally includes one or more of the first through the third examples, and further includes the method, wherein the provisioning information is further adapted to cause the first audio device to transmit, to the second audio device, the same, unmodified provisioning information that the first audio device received. A fifth example of the method optionally includes one or more of the first through the fourth examples, and further includes the method, wherein the provisioning information includes one or more of a service set identifier (SSID), a security type, and security information for the central access point. A sixth example of the method optionally includes one or more of the first through the fifth examples, and further includes the method, further including receiving, from the central access point, control instructions to adjust operation of one or more of the plurality of audio devices.

The disclosure also provides for a method for connecting a plurality of audio devices to a central access point, the method comprising, at a first audio device of the plurality of audio devices, receiving, from a second audio device of the plurality of audio devices, a discovery message, transmitting, to the second audio device, a response to the discovery message, receiving, from the second audio device, provisioning information including one or more of a service set identifier (SSID), a security type, and security information for the central access point, transmitting a discovery message to a third audio device of the plurality of audio devices, receiving, from the third audio device, a response to the discovery message, transmitting the received provisioning information to the third audio device, and transmitting, to the central access point, a connection request based on the provisional information. In a first example of the method, the method may additionally or alternatively further include receiving, from the central access point, control instructions from a control device to adjust operation of the first audio device, and adjusting operation according to the received control instructions. A second example of the method optionally includes the first example, and further includes the method, wherein the control device is the central access point. A third example of the method optionally includes one or both of the first example and the second example, and further includes the method, wherein the control device is the second audio device. A fourth example of the method optionally includes one or more of the first through the third examples, and further includes the method, wherein the control device is a fourth audio device of the plurality of audio devices, and wherein the second audio device received the provisioning information from the fourth audio device.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the computing device 104 or 304, the central access point 106 or 306, or the audio output devices 102*a-d* or 302*a-d* described with reference to FIGS. 1 and 3. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A computing device comprising:
    a network interface adapted to be communicatively connected to one or more audio devices;
    a processor; and
    a storage device storing instructions executable by the processor to:
        transmit a discovery message to a first audio device of the one or more audio devices; and
        upon receipt of a response to the discovery message from the first audio device, transmit provisioning information to the first audio device, the provisioning information including data that causes the first audio device to transmit further discovery messages to other audio devices and propagate the provisioning information to a second audio device that responds to the further discovery messages, the data of the provisioning information further causing the first audio device and the second audio device to transmit a connection request based on the provisioning information to a central access point, wherein the provisioning information includes one or more of a service set identifier (SSID), a security type, and security information for the central access point,
        wherein each of the first audio device and the second audio device are limited to discovering and sending provisioning information to a predetermined number of audio devices.

2. The computing device of claim 1, wherein the computing device is the central access point.

3. The computing device of claim 1, wherein the computing device is remote from the central access point.

4. The computing device of claim 3, wherein the instructions are further executable by the processor to receive the provisioning information from the central access point as encrypted data.

5. The computing device of claim 1, wherein the second audio device is configured to transmit additional further discovery messages to a third audio device and propagate the provisioning information to the third audio device responsive to receiving a response to the additional further discovery messages from the third audio device.

6. The computing device of claim 5, wherein the first audio device appends information regarding the first audio device to the provisioning information to generate and send updated provisioning information to the second audio device.

7. The computing device of claim 5, wherein the first audio device transmits, to the second audio device, the same, unmodified provisioning information that the first audio device receives from the computing device.

8. The computing device of claim 1, wherein the first audio device and the second audio device connect to the central access point after sending the connection request, and wherein the first audio device and the second audio device continue to discover and send the provisioning information to additional audio devices after connecting to the central access point.

9. The computing device of claim 1, wherein the sending of the provisioning information is continued until all discoverable audio devices within range of the first audio device have received the provisioning information, the discoverable audio devices including the second audio device that is within the range of the first audio device and additional audio devices that are also within the range of the first audio device.

10. A computing device comprising:
a network interface adapted to be communicatively connected to one or more audio devices on a network;
a processor; and
a storage device storing instructions executable by the processor to:
transmit a discovery message to a first audio device of the one or more audio devices; and
upon receipt of a response to the discovery message from the first audio device, transmit provisioning information to the first audio device, the provisioning information including data that causes the first audio device to transmit further discovery messages to other audio devices and propagate the provisioning information to a second audio device that responds to the further discovery messages, the data of the provisioning information further causing the first audio device and the second audio device to transmit a connection request for connecting to the network based on the provisioning information to a central access point of the network, wherein the provisioning information includes one or more of a service set identifier (SSID), a security type, and security information for the central access point,
wherein a total number of simultaneously-transmitted discovery messages on the network is limited to a predetermined total number.

11. The computing device of claim 10, wherein a total number of simultaneously-transmitted provisioning information transmissions is limited to the predetermined total number.

* * * * *